UNITED STATES PATENT OFFICE.

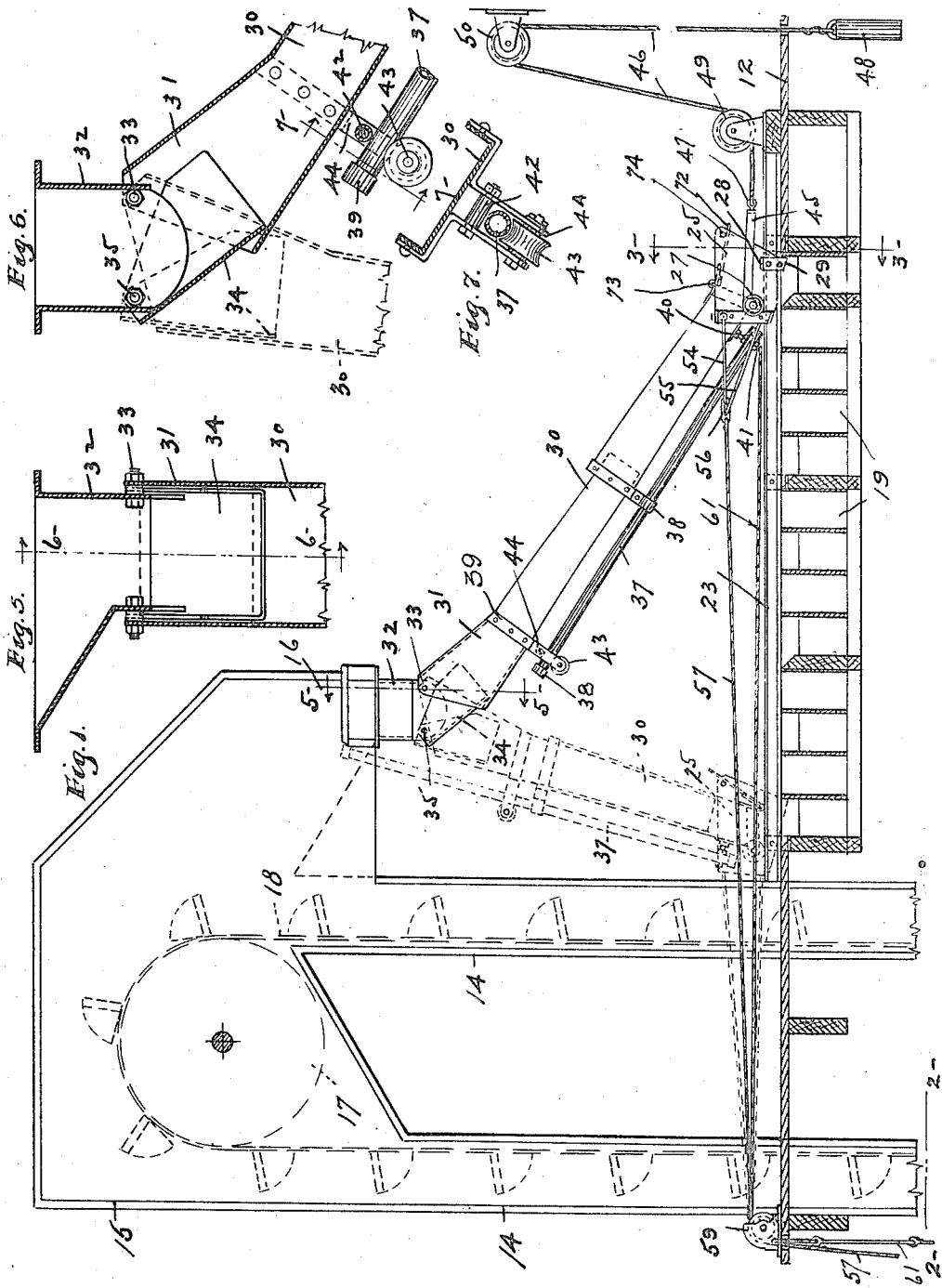

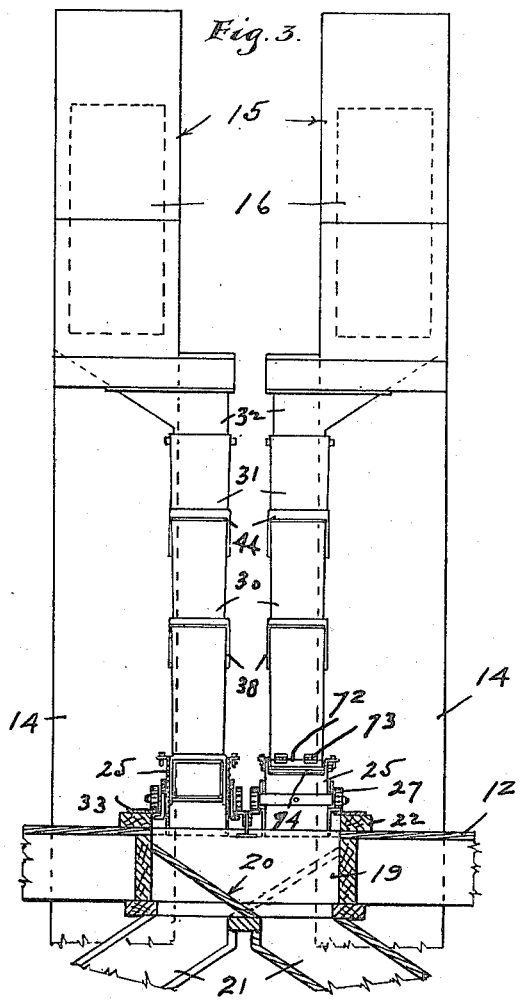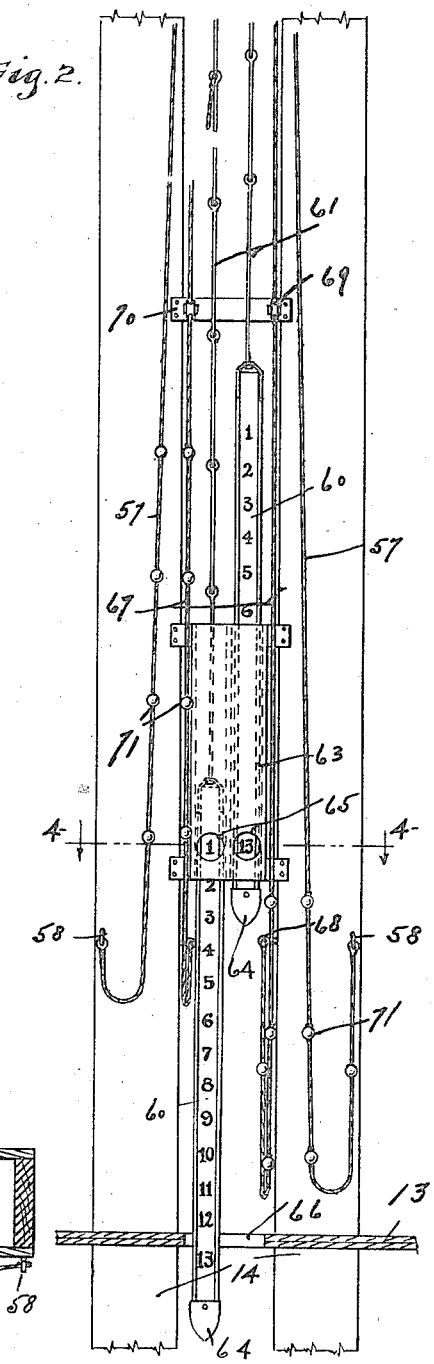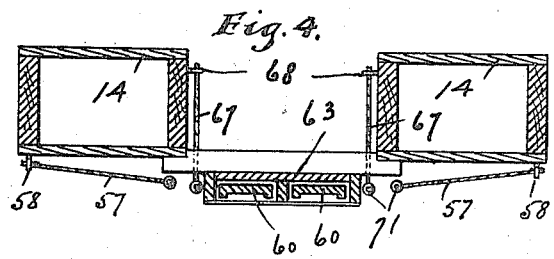

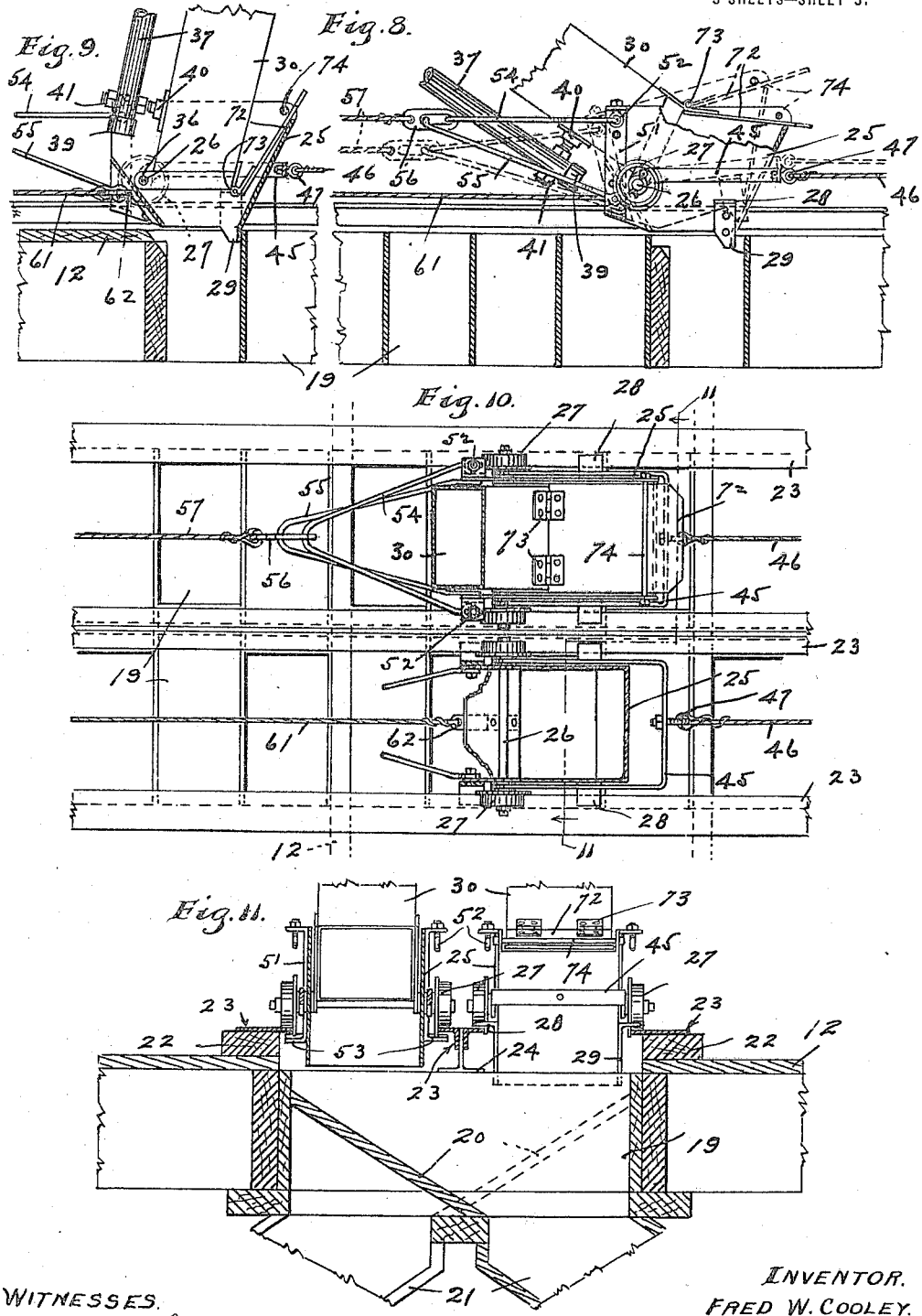

FRED W. COOLEY, OF MINNEAPOLIS, MINNESOTA, ASSIGNOR TO JAMES J. GERBER, OF MINNEAPOLIS, MINNESOTA.

DISTRIBUTING-SPOUT.

1,268,218.      Specification of Letters Patent.      Patented June 4, 1918.

Application filed January 29, 1917. Serial No. 145,048.

*To all whom it may concern:*

Be it known that I, FRED W. COOLEY, a citizen of the United States, residing at Minneapolis, in the county of Hennepin and State of Minnesota, have invented certain new and useful Improvements in Distributing-Spouts; and I do hereby declare the following to be a full, clear, and exact description of the invention, such as will enable others skilled in the art to which it appertains to make and use the same.

My invention relates to improvements in distributing spouts for grain and the like; and, to this end, it consists of the novel devices and combinations of devices hereinafter described and defined in the claims.

In the accompanying drawings, which illustrate the invention, like characters indicate like parts throughout the several views.

Referring to the drawings:

Figure 1 is a fragmentary view of the invention, partly in side elevation and partly in vertical section, with some parts shown in different positions by means of broken lines;

Fig. 2 is a fragmentary rear elevation of the invention, separated from the parts shown in Fig. 1 on the line 2—2 of said figure;

Fig. 3 is a view in front elevation, with some parts sectioned on the line 3—3 of Fig. 1;

Fig. 4 is a detail view in section taken on the line 4—4 of Fig. 2, on an enlarged scale;

Fig. 5 is a detail view in section taken on the line 5—5 of Fig. 1, on an enlarged scale;

Fig. 6 is a detail view in section taken on the line 6—6 of Fig. 5 with some parts shown in different positions by means of broken lines;

Fig. 7 is a detail view with some parts sectioned on the line 7—7 of Fig. 6;

Fig. 8 is an enlarged view of the delivery end portion of the distributing spout, as shown by full lines in Fig. 1;

Fig. 9 is a corresponding view with the exception that the distributing spout is moved into a position, as indicated by broken lines in Fig. 1;

Fig. 10 is a fragmentary plan view of the two distributing spouts, as shown by full lines in Fig. 1; and Fig. 11 is a detail view in section taken on the irregular line 11—11 of Fig. 10.

The numbers 12 and 13 indicate, respectively, upper and lower floor structures of a grain elevator or other building, and through which two floors extends two laterally spaced elevator legs 14. Each of these elevator legs 14 terminates in a head 15, having a forwardly offset hopper-like supply receptacle 16 with an open bottom which overhangs the floor structure 12. Journaled in each head 15, is a wheel 17 over which runs a cup-equipped elevator belt 18.

Formed in the floor structure 12, is a multiplicity of rectangular spout openings 19, as shown thirteen in number. These spout openings 19 are located on a line extended centrally from between the two elevator legs 14 and are spaced, one in advance of the other, and in front of said legs. Within each spout opening 19, is an apron 20 which directs the grain discharged therein to one side of the respective spout opening 19, and into a fixed conveying spout 21. By reference to Figs. 3 and 11, it will be noted that the positions of the aprons 20 are alternately changed, thus alternately separating the receiving ends of the conveying spouts 21 into two rows which extend in front of and away from the elevator legs 14. This arrangement permits the spout openings 14 to be placed close together and separated only by partitions; at the same time, it laterally spaces the receiving ends of the conveying spouts 21 of each row, thus giving sufficient room to properly locate and secure the same in position to the floor structure 12.

Secured to the floor structure 12 on each side of the spout openings 19, is a sill 22, and on which sills the outer rails of a double track 23 are secured. These outer rails are in the form of flat plates having their inner longitudinal edge portions off-set inward from the sills 22. The inner rails of the tracks 23 extending centrally over the spout openings 19, and as shown, are in the form of a pair of angle bars, having their vertical flanges turned downward, back to back, and rigidly secured to the web of an inverted T-bar 24, which, in turn, is secured to the floor structure 12.

The numeral 25 indicates a pair of open bottom hoppers, identical the one with the other, and each thereof is supported on an axle 26 journaled in the sides of said hopper. It is important to note that the axle 26 is located off-center, toward the back of the hopper 25, so that said hopper tends to tilt forward, the purpose of which will presently appear. On the outer projecting ends of the axle 25, is secured a pair of flanged wheels 27, arranged to run one pair on each of the tracks 23 and support the open bottoms of the hoppers 25 between the rails of said tracks and over the spout openings 19. The tilting movements of the hoppers 25 are limited by stop lugs 28, which normally rest upon the rails of the tracks 23. These stop lugs 28 are formed by bending, laterally, the upper ends of stop fingers 29 rigidly secured to the sides of the hoppers 25 at the fronts thereof. These stop fingers 29 project below the bottoms of the hoppers 25 for engagement with the partitions of the several spout openings 19 and thereby limit the movements of said hoppers away from the elevator legs 14, and also to properly position the open bottoms thereof over any one of said spout openings.

Two laterally spaced distributing spouts 30 lead from the supply receptacles 16 of the heads 15 to the hoppers 25, and each thereof comprises telescopically connected receiving and distributing sections. The upper end of the receiving section of each distributing spout 30 is expanded to form a head 31 into which projects the lower end of a throat-like extension 32, secured to the under side of the respective supply receptacle 16.

Extended through the sides of the head 33 and throat extension 32, close to the front walls thereof, is a pair of axially alined nut-equipped bolts 33 which pivotally connect the distributing spout 30 to said extension 32 for movement in a vertical plane from one side to the other of a perpendicular position. The opening between the head 31 and extension 32 is closed by a joint plate 34, having side flanges which embrace the sides of the extension 32. Nut-equipped bolts 35 are extended axially through the side of the extension 32 and flanges of the joint plate 34 and pivotally connect said joint plate thereto for swinging movement in the same vertical plane with the distributing spout 30. The lower end of the joint plate 34 extends into the head 31 and slides on the bottom thereof. When the distributing spout 30 is in a perpendicular position or in a position rearward thereof, the flanges of the joint plate 34 engage the front wall of the head 31 and hold said joint plate in engagement with the rear wall thereof. Obviously, grain discharged into the supply receptacle 16 by the elevator 18 flows through the extension 32, over the joint plate 34 and into the distributing spout 30.

The lower or outer end of the delivery section of the distributing spout 30 extends into the respective hopper 25, and the axle 26 thereof extends through ears 36, secured to the lower corners thereof, and pivotally connects the hopper 25 to the distributing spout 30 with freedom for vertical tilting movement.

The two sections of each distributing spout 30 are held in substantially axial alinement by a bar 37 which permits the required telescopic movement of said sections. As shown, this bar 37 is in the form of a pipe, having its ends closed by caps 38. A reinforcing strap 39 is secured around the inner end of the discharge section of the distributing spout 30 and is bent to form under said spout, at the transverse center thereof, an eye or loop in which the intermediate portion of the bar 37 is securely held with freedom for slight angular movement in a vertical plane. Rigidly secured on the delivery section of the distributing spout 30, is a depending screw-threaded stud 40 which projects through an aperture in the lower end of the bar 37. Opposing nuts 41 on the stud 40 engage opposite sides of the bar 37, and adjustably hold the same. The upper end of the bar 37 is held between a spacing thimble 42 and a concave roller 43 with freedom for endwise sliding movement to permit the required telescopic movement of the two sections of the distributing spout 30. The roller 43 is journaled in the depending end portions of a reinforcing strap 44 rigidly secured to the upper end portion of the receiving section of the distributing spout 30 and the spacing thimble 42 holds said depending end portions properly spaced.

A horizontally disposed bail 45 embraces each hopper 25 and its ends are pivotally anchored to the respective axle 26. One end of a cable 46 is attached to an eye 47 in the intermediate portion of said bail and a weight 48 is secured to the other end thereof. From the eye 47, the cable 46 runs over a guide sheave 49 secured to the floor structure 12, and from thence runs over a guide sheave 50, secured to a wall or other support at an elevation considerably above said floor structure. The weight 48 tends to draw the respective hopper 25 and distributing spout 30 away from the elevator legs 14, and also tends to hold the stop fingers 29 in engagement with one of the partitions between the spout openings 19, and thereby properly positions the open bottom of the hopper over one of said spout openings.

Secured on the sides of the hoppers 25 rearward of the axles 26 are vertically disposed reinforcing bars 51, the upper ends of which are bent laterally outward and have secured therein eye-bolts 52. The lower ends of these reinforcing bars 51 are also bent laterally outward under the rails of the tracks 23 to afford stops 53 which prevent the hoppers 25 from being lifted bodily from the tracks 23, but permit the required tilting movements thereof. Upper and lower horizontally disposed bails 54 and 55, respectively, are pivotally attached at their ends, the former to the eye-bolts 52 which are above the axle 26, and the latter to the sides of the hoppers 25 and reinforcing bars 51 below the axles 26. The intermediate portions of the bails 54 and 55 are contracted and secured within a slotted link 56. One end of a cable 57 is attached to the link 56 and the other end thereof is secured at 58 to one of the elevator legs 14 within easy reach of the operator standing on the floor structure 13. The intermediate portions of the cables 57 run over guide sheaves 59, secured to the floor structure 12 at the rear of the elevator legs 14.

Under an initial pull on the cable 57, the bail 54, which is connected to the hopper 25 above the axle 26, tilts said hopper backward and carries its stop fingers 29 over the partitions between the several spout openings 19, as shown by broken lines in Fig. 8. Normally the bail 55 rests loosely in the slotted link 56 and during the initial pull on the cable 57 remains idle. A further pull on the cable 57 will be transmitted to the hopper 25 through both of the bails 54 and 55, and said hopper moved thereby, toward the elevator leg 14 against the action of the weight 48.

To independently position the hopper 25 over the same or any one of the spout openings 19, there is provided for use in connection with each thereof, an indicator slide 60. A pair of cables 61 connect the respective hoppers 25 and indicator slides 60 and their intermediate portions run over the guide sheaves 59. The upper ends of these cables 61 are attached to metal straps 62 riveted to the back plates of the hoppers 25. It is important to note that the connections between the cables 61 and metal straps 62 are below the axles 26, so that a pull on said cable will tend to tilt the hoppers 26 forward and carry their stop fingers 29 into operative positions.

From the hoppers 25 to the guide sheaves 59, the cables 61 extend substantially parallel above the floor structure 12. After passing over the guide sheaves 59, the cables 61 extend downward through an aperture in the floor structure 12 and suspend the indicator slides 60 with freedom for raising or lowering movements in a casing or guide 63 secured to the elevator legs 14 between the floor structures 12 and 13. On the lower end of each indicator slide 60 is a weight 64 which keeps the respective cable 61 taut. To reduce the stretching of the cables 61 to a minimum, the vertical portions thereof are, as shown, preferably, made up of long wire links. Each indicator slide 60 is graduated longitudinally by making thereon, equal distant apart, the numerals one to thirteen, inclusive, and which numerals indicate, respectively, the spout openings 19, counting from the elevator legs 14, outward. Sight openings 65 are formed in the casing 63 and through which the numerals on the indicator slides 60 successively appear as said slides are raised or lowered by the movements of the hoppers 25 from one spout opening to the other. For instance, when one of the hoppers 25 is positioned, as shown in Fig. 8, the numeral thirteen of the respective indicator slide 60 will appear in its sight opening 65 or when one of the hoppers 25 is in a position, as shown in Fig. 9, the numeral one of the respective indicator slide 60 will appear in its sight opening 65. It will thus be seen that an operator standing on the floor structure 13 may set the hoppers 25 over the same or any one of the spout openings 19. An aperture 66 is cut in the floor structure 13 to permit the lower ends of the indicator slide 60 to work therethrough when in their lowermost positions.

To the vertical section of each cable 61 is attached one end of a branch cable 67 and the other end is attached at 68 to one of the elevator legs 14. The intermediate portions of the branch cables 67 runs under guide sheaves 69 on a bar 70 secured to the elevator legs 14. Ball-like hand grips 71 are secured to the cables 57 and branch cables 67. A cover 72 is provided for each hopper 25 to prevent an overflow or discharge of grain through the open tops thereof. These covers 72 are hinged at 73 to the upper edges of the discharge ends of the distributing spouts 30 and their free ends rest upon the upper edges of the front plates of the hoppers 25 with freedom for sliding movements. Rods 74 secured in the side of the hoppers 25 overlie the covers 72 and hold the same against lifting movements.

By drawing on either one of the cables 57, the respective hopper 25 is first tilted backward, as previously described, and then moved toward the elevator legs 14. It may be here stated that the bail 55 limits the backward tilting movement of the hopper 25. The operator may position the hopper 25 in registration with any one of the spout openings 19 by watching the indicator slide 60. Then by taking hold of the respective branch cable 67, the hopper 25 may be tilted forward to carry its stop fingers 29 into operative positions. Upon releasing the branch cable 61, the weight 48 will draw the hopper 25 forward until stopped by the engagement of its stop fingers 29 with the adjacent partition between the spout openings 19. When the hopper 25 is being moved toward the elevator legs 14, their stop fingers 29, in case the same are not lifted high enough to clear the partitions, will be cammed thereover, owing to their rear beveled edges.

In case the hopper 25 is to be moved away from the elevator legs 14, the same is tilted backward by drawing on the cable 57 to carry its stop fingers 29 into inoperative positions. Then by letting the weight 48 draw the hopper 25 forward, the same may be stopped, at will, over any one of the spout openings 19. By reference to Fig. 8, it will be noted that under the backward tilting movement of the hopper 25, the top lugs 28 engage the arms of the bail 45 and lift the same. It will thus be seen that in addition to the pull on the branch cable 61, the downward pull of the cable 46, acting on the stop lugs 28 through the bail 45, together with the action of gravity, will assist in tilting the hopper 25 forward.

From the above description it is evident that a multiplicity of spout openings may be located in close relation to each other and to the elevator legs, and that the distributing spouts may be used where there is comparatively little head room with respect to the heads 15 of the elevator legs 14.

What I claim is:—

1. The combination with two supply receptacles, of a row of spout openings extending away from said receptacles on substantially a straight line and having reversely offset and overlapping receiving ends, and two substantially parallel distributing spouts arranged to receive from said receptacles and having their delivery ends arranged to be independently brought into registration with the same or any one of said spout openings.

2. The combination with two supply receptacles, of a row of spout openings extending away from said receptacles on substantially a straight line, of two substantially parallel distributing spouts arranged to receive from said receptacles and having their delivery ends arranged to be independently brought into registration with the same or any one of said spout openings.

3. The combination with a supply receptacle, of a plurality of spout openings spaced, one in advance of the other on substantially a straight line extending from said receptacle, a longitudinally extensible and contractible distributing spout having its receiving end arranged to receive from said receptacle and mounted for movement in a vertical plane to carry its delivery end into registration with any one of said spout openings, and yielding means under strain to extend said spout and carry its delivery end successively into registration with the spout openings.

4. The combination with a supply receptacle, of a plurality of spout openings spaced, one in advance of the other with respect to said receptacle, a telescopic distributing spout leading from said receptacle and mounted for movement in a vertical plane, an open bottom hopper on the delivery end of said spout and mounted for traveling movement over the spout openings, a stop for holding the hopper in registration with any one of the spout openings, and means for imparting traveling movement to the hopper and for rendering said stop inoperative, at will.

5. The combination with a supply receptacle, of a plurality of spout openings spaced, one in advance of the other with respect to said receptacle, a telescopic distributing spout leading from said receptacle and mounted for movement in a vertical plane, an open bottom hopper on the delivery end of said spout and mounted for traveling movement over the spout openings, a stop for holding the hopper in registration with any one of the spout openings, yielding means tending to move the hopper away from said receptacle, and connections for moving the hopper toward said receptacle and for rendering said stop inoperative, at will.

6. The combination with a supply receptacle, of a plurality of spout openings spaced, one in advance of the other with respect to said receptacle, a telescopic distributing spout leading from said receptacle and mounted for movement in a vertical plane, an open bottom hopper pivoted to the delivery end of said spout for vertical tilting movement and mounted for traveling movement over the spout openings, a stop on the hopper for holding the same in registration with any one of the spout openings, yielding means tending to move the hopper away from said receptacle, and a connection for rearwardly tilting said hopper to render said stop inoperative and for moving the hopper toward said receptacle.

7. The combination with a supply receptacle, of a plurality of spout openings spaced, one in advance of the other with respect to said receptacle, a telescopic distributing spout leading from said receptacle and mounted for movement in a vertical plane, an open bottom hopper pivoted to the delivery end of said spout for vertical tilting movement and mounted for traveling movement over the spout openings, a stop on the hopper for holding the same in registration with any one of the spout openings, yielding means tending to move the hopper away from said receptacle, and a second connection for holding the hopper upon the release of the first noted connection and for forwardly tilting the hopper to render its stop operative.

8. The combination with a supply receptacle, of a plurality of spout openings spaced, one in advance of the other with respect to said receptacle, a telescopic distributing spout leading from said receptacle and mounted for movement in a vertical plane, an open bottom hopper pivoted to the delivery end of said spout for vertical tilting movement and mounted for traveling movement over the spout openings, a stop on the hopper for holding the same in registration with any one of the spout openings, yielding means tending to move the hopper away from said receptacle, and a stop for limiting the forward tilting movement of the hopper.

9. The combination with a supply receptacle, of a plurality of spout openings spaced, one in advance of the other with respect to said receptacle, a telescopic distributing spout leading from said receptacle and mounted for movement in a vertical plane, an open bottom hopper pivoted to the delivery end of said spout for vertical tilting movement and mounted for traveling movement over the spout openings, a stop on the hopper for holding the same in registration with any one of the spout openings, yielding means tending to move the hopper away from said receptacle, and means for holding the hopper against bodily lifting movement.

10. The combination with a supply receptacle, of a plurality of spout openings spaced, one in advance of the other with respect to said receptacle, a telescopic distributing spout leading from said receptacle and mounted for movement in a vertical plane, track rails, an open bottom hopper pivoted to the delivery end of said spout for vertical tilting movement and mounted on the track rails for traveling movement over the spout openings, a stop on the hopper for holding the same in registration with any one of the spout openings, yielding means tending to move the hopper away from said receptacle, a connection for rearwardly tilting said hopper to render said stop inoperative and for moving the hopper toward said receptacle, a stop limiting the forward tilting movement of the hopper, and means for holding the hopper against bodily lifting movement from the track rails.

11. The combination with a supply receptacle, of a plurality of spout openings spaced, one in advance of the other with respect to said receptacle, a telescopic distributing spout leading from said receptacle and mounted for movement in a vertical plane, an open bottom hopper pivoted to the delivery end of said spout for vertical tilting movement and mounted for traveling movement over the spout openings, a stop on the hopper for holding the same in registration with any one of the spout openings, yielding means tending to move the hopper away from said receptacle, upper and lower bails attached to the hopper, a slotted link connecting said bails, a pulling cable attached to said link for moving the hopper; said lower bail limiting the rearward tilting movement of the hopper, and a connection for holding the hopper upon the release of the pulling cable and for forwardly tilting the hopper to render its stop operative.

12. The combination with a supply receptacle, of a plurality of spout openings spaced, one in advance of the other with respect to said receptacle, a telescopic distributing spout leading from said receptacle and mounted for movement in a vertical plane, an open bottom hopper pivoted to the delivery end of said spout for vertical tilting movement and mounted for traveling movement over the spout openings, and a cover for the hopper; said cover being hinged to said spout and secured to the hopper with freedom for sliding movement.

13. The combination with a supply receptacle, of a distributing spout pivoted for vertical swinging movement to and from substantially a perpendicular position, a joint plate pivoted with respect to the receptacle and loosely hanging in the receiving end of the spout, with freedom for vertical swinging movement with respect thereto, and gravity held on the bottom thereof, except when said spout is moved into substantially a perpendicular position, and means operative at substantially the extreme longitudinal movement of the joint plate into the spout to hold said joint plate for common vertical swinging movement with said spout.

14. The combination with a supply receptacle, of a distributing spout pivoted for vertical swinging movement to and from substantially a perpendicular position, the top and bottom walls of the receiving end of the spout being in diverging relation, and a joint plate pivoted with respect to the receptacle and loosely hanging in the receiving end of the spout, with freedom for longitudinal sliding movement on the bottom thereof during the vertical swinging movement of the spout, said joint plate having side flanges arranged to engage the top wall of the spout at substantially the extreme longitudinal movement of the joint plate into said spout.

15. The combination with two supply receptacles, of a row of spout openings extending away from said receptacles on substantially a straight line, and having at their receiving ends inclined aprons, the positions of which are alternately changed, and two substantially parallel distributing spouts arranged to receive from the receptacles and having their delivery ends arranged to be independently brought into registration with same or any one of the spout openings.

16. The combination with a supply receptacle, of a plurality of spout openings spaced, one in advance of the other with respect to said receptacle, a telescopic distributing spout leading from said receptacle and mounted for movement in a vertical plane, an open bottom hopper pivoted to the delivery end of said spout for vertical tilting movement and mounted for traveling movement over the spout openings, a stop on the hopper for holding the same in registration with any one of the spout openings, yielding means tending to move the hopper away from said receptacle, a connection for rearwardly tilting said hopper to render said stop inoperative and for moving the hopper toward said receptacle, an indicator slide, a main cable connecting said slide to the hopper, and a branch cable attached to said main cable for holding the hopper upon the release of the means for holding the hopper and for forwardly tilting the hopper to render its stop operative.

In testimony whereof I affix my signature in presence of two witnesses.

FRED W. COOLEY.

Witnesses:
EVA E. KÖNIG,
HARRY D. KILGORE.